Jan. 28, 1941.  W. F. ROGERS  2,229,873
HEATER MOUNTING FOR ELECTRIC STOVES
Filed July 29, 1939   2 Sheets-Sheet 1
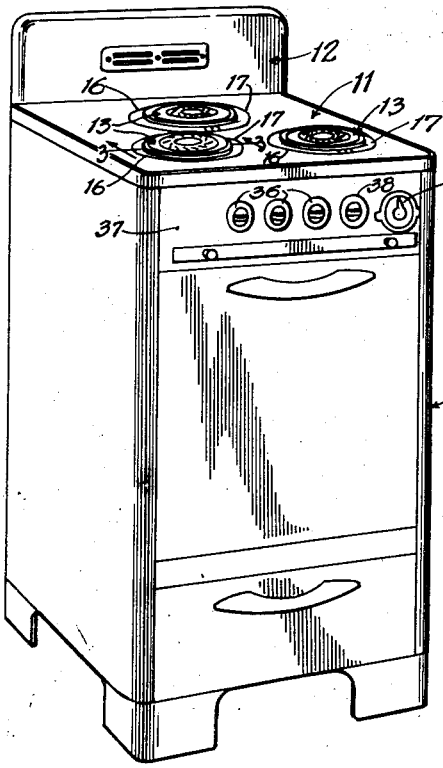
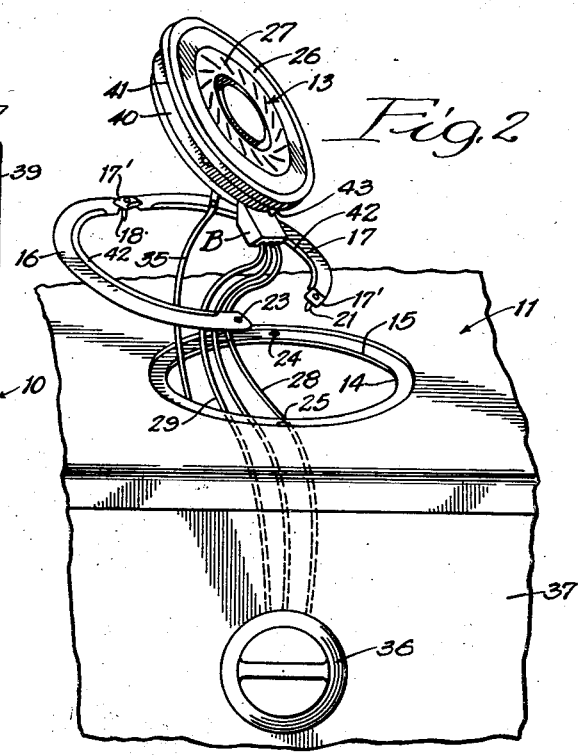
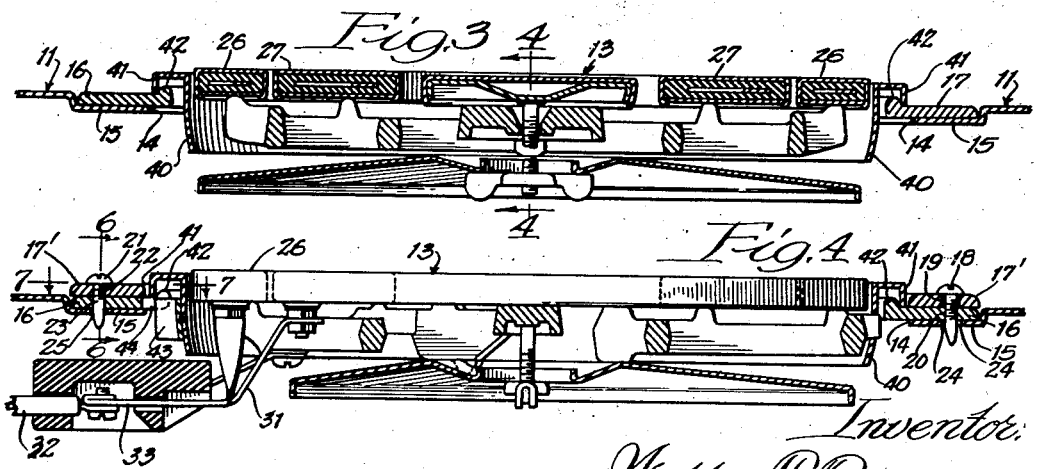
Inventor:
Walter F. Rogers,
By Fisher, Clapp, Soans & Wood
Attorneys.

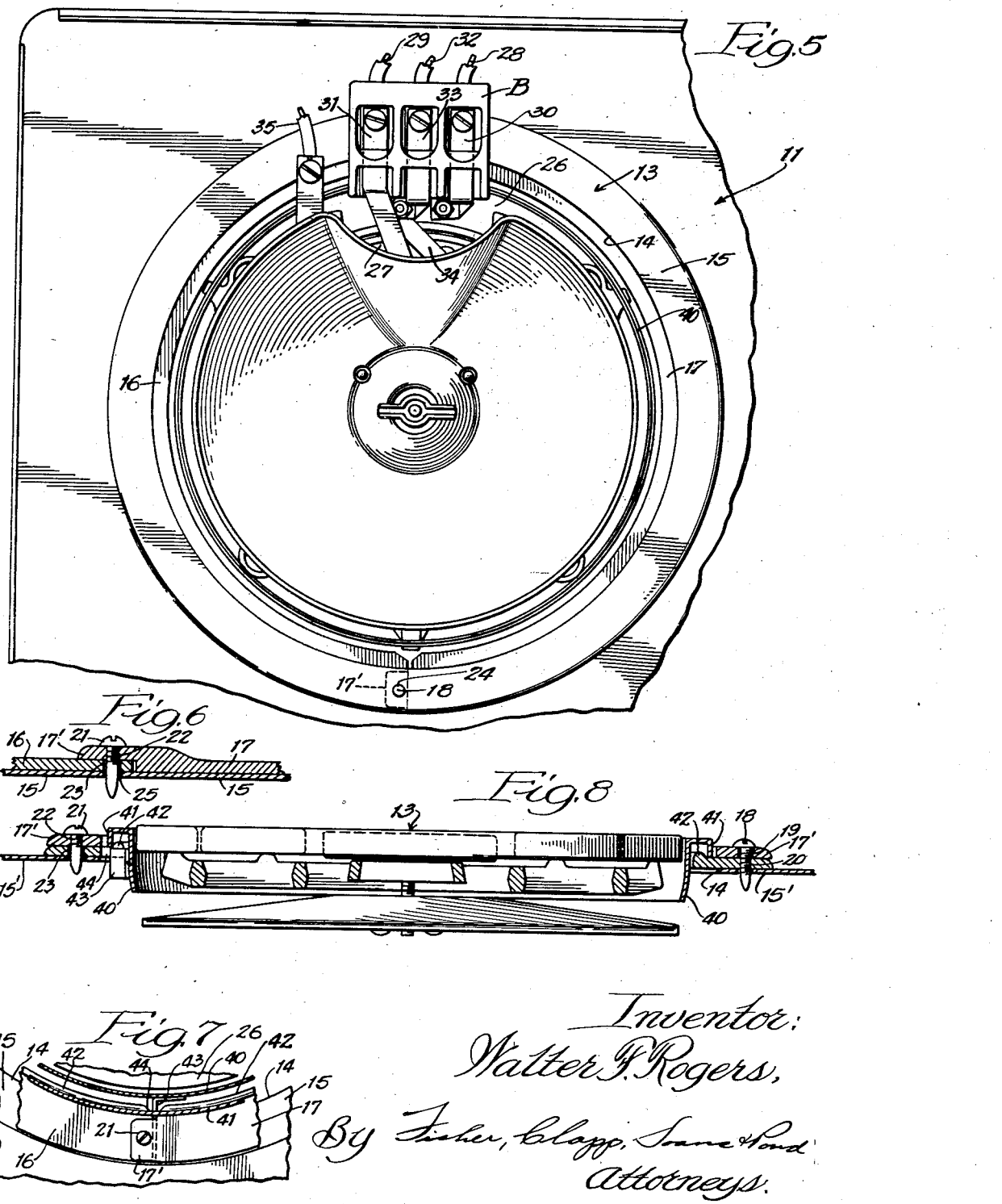

Patented Jan. 28, 1941

2,229,873

UNITED STATES PATENT OFFICE 2,229,873

HEATER MOUNTING FOR ELECTRIC STOVES

Walter F. Rogers, Oak Park, Ill., assignor to Crown Stove Works, Cicero, Ill., a corporation of Illinois Application July 29, 1939, Serial No. 287,222

4 Claims. (Cl. 219—37)

This invention pertains to the art of electric stoves and ranges, and has reference more particularly to heater mountings for such stoves.

The flat tops of electric stoves commonly have an enamel finish, and are formed with holes to receive the electric heater units. As hitherto made, the hole is of slightly less diameter than the full diameter of the heater, the outer shell of the latter projecting down through the hole and having a top peripheral flange resting on the portion of the stove top plate bounding the hole. Leads from the resistance element or elements of the heater extend downwardly through the hole to a switch on the front of the stove.

Through the careless handling of pots, frying pans, and other heavy cooking utensils it not infrequently happens that the enamel surface of the stove top becomes scratched, chipped, or otherwise marred, requiring a new or repaired stove top. To remove and replace the top the heater leads must be first disconnected from the heating unit or units of the stove top, because the latter cannot be passed over the heating unit or units, since the holes in the top are of less diameter than the units. Instances have been known where the repair man has wrongly reconnected the leads to the heater or heaters, with the result of serious damage to the latter and considerable consequent expense.

The main object of the present invention has been to provide an improved heater mounting that will obviate the above noted damage and expense, and enable the stove top to be removed and replaced without any disconnecting and subsequent reconnecting of the leads to the heating unit.

An approved embodiment of the invention is illustrated in the accompanying drawings, in which—

Fig. 1 is a perspective elevation of an electric stove equipped with my improvements, the stove top being shown as supplied with three heater units.

Fig. 2 is a fragmentary perspective view of the stove top and one heater unit, the latter being shown raised, and the split adapter ring, which supports the heater unit, being shown opened to permit its removal from the heater leads so that the hole in the stove top can pass over the heater leaving the connections of the leads to the heater intact.

Fig. 3 is an enlarged vertical section through one of the heater units taken on the line 3—3 of Fig. 1.

Fig. 4 is a section similar to, but in a plane at right angles to the plane of, Fig. 3, taken on the line 4—4 of Fig. 3.

Fig. 5 is a bottom plan view of the unit, heater and a fragment of the stove top.

Fig. 6 is a detail vertical section taken on the line 6—6 of Fig. 4.

Fig. 7 is a fragmentary horizontal section, taken on the line 7—7 of Fig. 4.

Fig. 8 is a vertical section, similar to Fig. 4, of a slight modification.

Referring to the drawings, 10 designates as an entirety the body of the stove, 11 the flat, enamel surfaced top, 12 the usual rear splash board or "fence," and 13 each of three electric heating units mounted in the top 11. Since the top heating units 13 are all alike, a description of the mounting of one will suffice for all.

In the stove top 11 is formed a circular hole 14; the metal of the top bounding the hole 14 being preferably countersunk as shown at 15. This countersunk portion of the top forms a seat for a radially divided adapter ring that constitutes the chief novel feature of the present invention. In the preferred form of this ring herein shown, it comprises two substantially semi-circular sections 16 and 17. One of these sections, such as 17, is formed at its ends with short vertically offset portions 17' that, as best shown in Fig. 4, overlap the meeting ends of the companion section 16. The two sections are pivotally connected at the rear by a pivot pin 18, the shank of which is threaded and extends through a plain hole 19 in the overlapping end 17' and engages with a tapped hole 20 in the meeting end of the section 16. The front heating ends of the ring sections 16 and 17 are separably connected by a connecting pin 21 having a threaded stem that engages with a tapped hole 22 in the front overlapped end 17' and through a plain hole 23 in the underlying end of the ring section 16. In the countersunk seat 15 of the stove top are a pair of diametrically opposed holes 24 and 25 (Fig. 2), and the pins 18 and 21 are made long enough for their pointed lower ends to engage with the holes 24 and 25, as clearly shown in Fig. 4. By this means the adapter ring is accurately located on its seat 15.

Any type of electric unit may be used. The one herein shown is a known commercial article. It is formed in its top with a pair of outer and inner concentric rings 26 and 27 containing resistance elements that are supplied with current through leads 28 and 29 respectively connected to bus-bars 30 and 31 (Fig. 5), said bus-bars being connected respectively to the rings 26 and 27. A common return lead 32 extends from the central bus-bar 33 that is electrically connected to both of the heater rings 26 and 27 through a cross bus-bar 34. A ground lead 35 connects the metal frame of the heater to the metal body of the stove, the latter being usually supplied with a ground connection (not shown) in order to prevent any possible shock to the user of the stove through leakage of the current. A skeleton block B of insulating material houses the bus-bars 30, 31 and 33, insulating them from any contact with the frame structure of the heater. A manually operable switch 36 mounted in the upper front panel 37 of the stove controls the supply of current to each heater unit. The panel 37 is also shown equipped with a similar oven heater switch 38 and an oven temperature regulator 39, which features are old and constitute no part of this invention.

From Fig. 2 it will be seen that all of the stove leads, 28, 29, 32 and 35 extend down through both the stove top hole and the adapter ring.

As shown in Figs. 3 and 4, in the assembled position of the parts the adapter ring is closed and rests on its countersunk seat 15 of the stove top, and it is also both located and locked against turning movement by the pins 18 and 21 extending through and beneath the holes 24 and 25. The heater unit itself includes an outer circular skirt 40 that projects downwardly through the hole 14 and is formed with an upper depending flange 41 that rests on the adapter ring; the latter being preferably formed on its inner periphery with a low upstanding circular bead 42 by which the unit is accurately centered.

Turning movement of the heater relatively to the adapter ring is prevented by a radial lug 43, best shown in Fig. 4, that projects into a narrow gap or notch 44 between the inner peripheral portions of the adapter ring sections.

The modified structure illustrated in Fig. 8 consists simply in omitting the countersink which seats the adapter ring in the structure above described, the adapter ring being seated on the portion 15' of the stove top that bounds the hole 14 and is flush with the remaining portion of the stove top. The countersunk form, however, is preferable because enlarging the flat unobstructed area of the stove top by approximately the width of the adapter ring.

Fig. 2 illustrates the way in which the stove top 11 may be removed from the stove without disconnecting any of the leads from the heater unit. All that is necessary is to withdraw the connector pin 21 so that the connected ends of the ring may be separated. The ring is then lifted and its previously connected ends separated so that it may be removed from its position surrounding the leads, whereupon, by reason of the fact that the hole 14 is of larger diameter than the heater unit 13, the heater units may be lowered into the top compartment of the stove and the top may then be removed from the frame without the necessity of disconnecting any of the leads from the unit.

Modifications and changes in the details of structure and arrangement may be resorted to within the purview and coverage of the appended claims.

I claim:

1. The combination with a stove top having a hole to receive an electric heating unit, of a heating unit of less diameter than said hole and having a lead connected thereto extending through said hole, and an adapter ring of greater external diameter than said hole seated on the portion of the top bounding said hole and supporting said heating unit, said adapter ring comprising two sections pivotally connected to each other at one end and in its supporting condition of less internal diameter than said heating unit.

2. The combination with a stove top having a hole to receive an electric heating unit, of a heating unit of less diameter than said hole and having a lead connected thereto extending through said hole, an adapter ring of greater external diameter than said hole seated on the portion of the top bounding said hole and supporting said heating unit, said adapter ring comprising two sections, a pivot pin connecting said sections to each other at one end thereof, and means separably connecting the other ends of said sections, said adapter ring in its supporting condition being of less internal diameter than said heating unit.

3. The combination with a stove top having a hole to receive an electric heating unit, of a heating unit of less diameter than said hole and having a lead connected thereto, an adapter ring of greater external diameter than said hole seated on the portion of the top bounding said hole, said hole bounding portion having diametrically opposed ring locating holes, said adapter ring comprising two substantially semi-circular sections with the ends of one section vertically offset to overlap the ends of the other section, a pivot pin connecting said sections to each other at one end thereof, and a connecting pin separably connecting the other ends of said sections; both said pivot pin and said connecting pin extending through said ring locating holes.

4. An embodiment of the structure defined in claim 3, wherein the pivot pin has threaded engagement with the lower of the overlapped ring section ends, and the connecting pin has threaded engagement with the upper of the overlapped ring section ends.

WALTER F. ROGERS.